United States Patent [19]

d'Auria et al.

[11] Patent Number: 4,653,042
[45] Date of Patent: Mar. 24, 1987

[54] DEVICE FOR STORING INFORMATION IN AN OPTICAL FIBER TRANSMISSION SYSTEM

[75] Inventors: Luigi d'Auria, Sceaux; Jean-Claude Ballegeer, Jouy En Josas; Duyet N. Huu, Bouvelles, all of France

[73] Assignee: Thomson-CSF, Paris, France

[21] Appl. No.: 663,164

[22] Filed: Oct. 22, 1984

[30] Foreign Application Priority Data

Oct. 25, 1983 [FR] France .................. 83 16998

[51] Int. Cl.⁴ ............................................. H04B 9/00
[52] U.S. Cl. .............................. 370/3; 455/607; 455/612
[58] Field of Search ............. 455/605, 606, 607, 612, 455/610; 370/3; 350/96.15, 96.16

[56] References Cited

U.S. PATENT DOCUMENTS

| | | | |
|---|---|---|---|
| 3,953,727 | 4/1976 | d'Auria et al. | 455/610 |
| 4,166,212 | 8/1979 | Judeinstein | 455/612 |
| 4,326,298 | 4/1982 | Fromm et al. | 455/612 |
| 4,473,270 | 9/1984 | Shaw | 455/612 |
| 4,479,701 | 10/1984 | Newton et al. | 455/610 |

FOREIGN PATENT DOCUMENTS

| | | | |
|---|---|---|---|
| 57-14803 | 1/1982 | Japan | 350/96.15 |
| 57-23343 | 2/1982 | Japan | 455/606 |
| 57-127342 | 8/1982 | Japan | 370/3 |

OTHER PUBLICATIONS

Cheng et al.—Subscriber Loop Architecture—AT&T Tech. Digest No. 75, Sep. 1984 pp. 9–10.
Patents Abstracts of Japan, vol. 7, No. 158(E-186) (1303), Jul. 12, 1983 and JP A 58-66 495.
Patents Abstracts of Japan, vol. 7, No. 17(E-154) (1162), 22 Jan. 1983; and JP-A-57 174 947.
N.E.C. Research and Development, No. 69, Apr. 1983, pp. 24–29, Tokyo, Japan; M. Tada et al.

Primary Examiner—Joseph A. Orsino, Jr.
Attorney, Agent, or Firm—Oblon, Fisher, Spivak, McClelland & Maier

[57] ABSTRACT

A device for storing information in an optical fiber transmission system, the storage of information, in particular in the form of digital data, being provided by creating at least one circulating memory using the optical fiber connecting terminals together as delay line. The transmissions takes place at a first wave length and each circulating memory uses a particular wave length, different from that of the other memories and from the transmission wave length. Each memory comprises, in a first terminal, a light source, a detector and a multiplexer for coupling with the connecting optical fiber and, in the terminal which is coupled thereto, a dichroic mirror selectively reflecting the wave lengths of the circulating memories and transmitting the other wave lengths.

12 Claims, 6 Drawing Figures

DEVICE FOR STORING INFORMATION IN AN OPTICAL FIBER TRANSMISSION SYSTEM

BACKGROUND OF THE INVENTION

1. Field of the Invention

The present invention relates to a device for storing information, in particular information formed by digital data, in a transmission system between at least first and second terminals coupled together by one or more optical fibers forming a connecting channel.

2. Description of the Prior Art

For different reasons and particularly in the case of momentary occupation of the connecting channels, it is necessary to have storage means.

Therefore, memories are usually associated with the terminals connected to a connecting channel which may have diverse logic architectures. The functions fulfilled may also be diverse.

Memories of the buffer type are generally associated with the terminals capable of storing, at least temporarily, one or more messages to be transmitted or received.

It is known moreover that an optical fiber behaves, with respect to a guided wave, as a delay line.

In fact, since the speed of propagation of light is finite, a light pulse injected at one end of an optical fiber propagates there along in a guided mode and reaches the other end after a time interval which will be called in what follows "mean propagation time $\tau_o$", which time may be easily determined if the length of the optical fiber is known. Thus, an optical fiber may be used as delay line and therefore as storage element of a memory of the data flow type; the storage capacity of the memory of this type depending on the propagation time, i.e. in the present case on the length of the optical fiber and on the flow rate of the information injected at the input.

The invention takes advantage of the physical phenomenon which has just been recalled.

SUMMARY OF THE INVENTION

According to the invention, the optical fiber or fibers conveying the signals to be transmitted from one terminal to another will also be used for forming the basic element of at least one circulating memory.

For this, according to one of the most important aspects of the invention, transmission of information between the terminals by optical fibers is provided by means of a light wave having a narrow spectrum centered on a first wave length and the storage of information takes place by causing this information to circulate over the same optical fiber by means of a light wave having a narrow spectrum centered on a second wave length, distinct from the first spectrum.

According to another important aspect of the invention, selective retransmission means are provided so as to retransmit the light wave of the second wave length to the terminal which emitted it.

In another variant, several memories, separate from the software point of view although commonly using the same physical optical fiber connection, as delay line, may be provided by using several wave lengths, distinct from each other and distinct from the first wave length used conventionally for transmission purposes.

The invention therefore provides a device for storing information in a transmission system comprising at least first and second terminals coupled together by an optical fiber connection channel, transmissions of information being provided through means emitting light radiations of a first wave length modulated by the information to be transmitted and opto-electronic means for detecting these radiations, which means are coupled optically to said optical fiber connection channel and at least one circulating memory associated with at least one of the terminals using said optical fiber of the connection channel as delay line; wherein said circulating memory comprises, in the terminal with which it is associated, a means for emitting light radiations of a second wave length different from said first wave length, modulated by the information to be stored, an opto-electronic means for detecting these radiations, a multiplexer coupled optically to the optical fiber of the connection channel, injecting into this optical fiber the radiations of the second wave length emitted by said emitting means and taking them selectively for transmitting them to the opto-electronic detection means and, in a second terminal, coupled to the first one by the connecting optical fiber, an optical means selectively retransmitting over the optical fiber of the connection channel the radiations of the second wave length so that it forms a delay line of twice the length of that of the optical fiber of the connecting channel.

BRIEF DESCRIPTION OF THE DRAWINGS

The invention will be better understood and other advantages will be clear from the following description with reference to the accompanying Figures.

DESCRIPTION OF THE PREFERRED EMBODIMENTS

Figure 1:
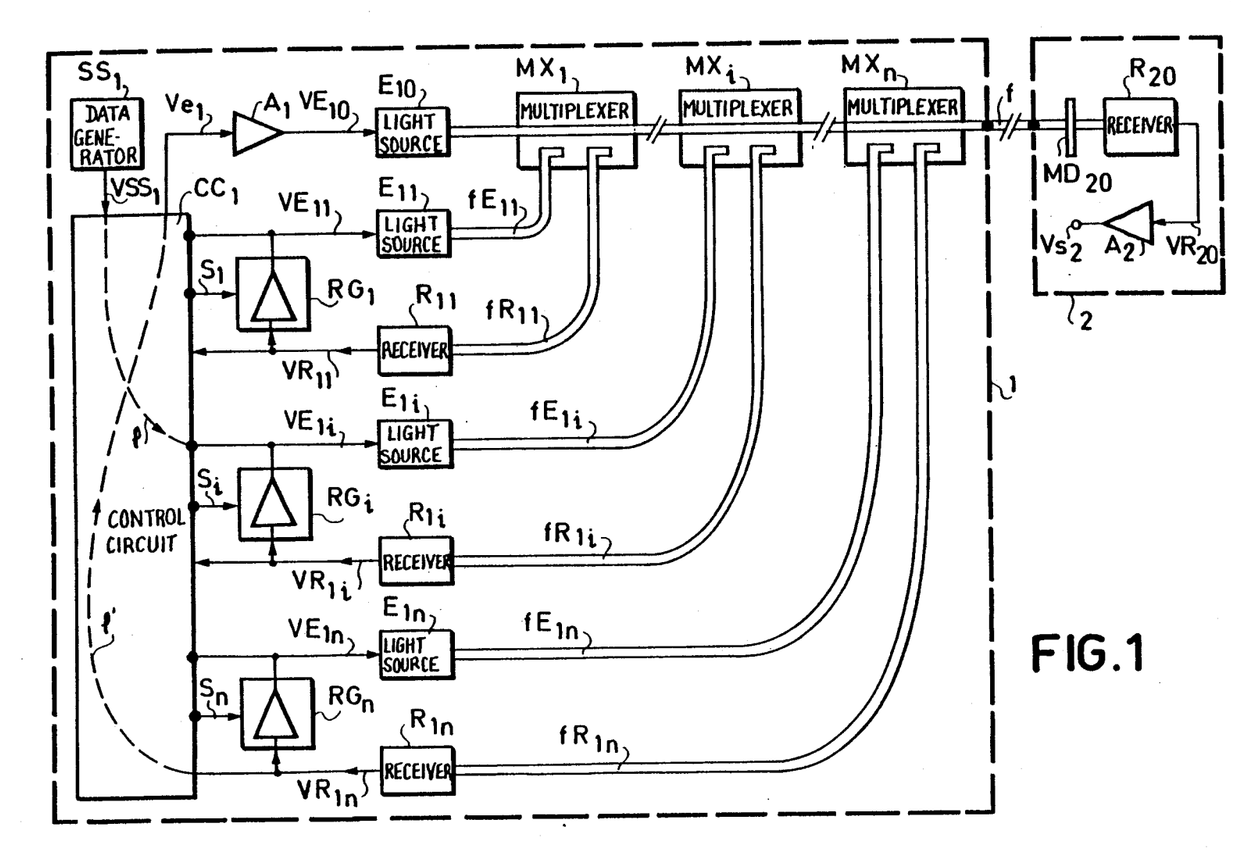
FIG. 1 illustrates schematically the device of the invention.

FIG. 1 illustrates schematically the main arrangements adopted within the scope of the invention.

The connection illustrated is a series optical fiber connection of the unidirectional type between a first terminal 1, or emitting terminal and a second terminal 2, or receiving terminal.

For a clearer understanding, it will be assumed in the following that it is a question of digital data transmissions and that this data consists of binary words of a fixed number of binary elements or bits. Each bit is represented by a light pulse which will be propagated along a single optical fiber channel f connecting the two terminals together.

These conventions are of course in no way limiting to the scope of the invention. All other types of optical fiber transmission remain within the scope of the invention.

Conventionally, the emitting terminal 1 comprises a light energy source $E_{10}$ emitting at a wave length which will be referenced $\lambda_o$ in what follows. Preferably, this source is a semi conductor laser or a light emitting diode controlled by electric signals $VE_{10}$. These signals are supplied by a matching and amplification means $A_1$ and represent the information to be transmitted.

This information is usually generated by any appropriate source, shown by the general reference $SS_1$.

Usually also, the emitting terminal 1 comprises a transmission control and management circuit $CC_1$.

These circuits $CC_1$, more especially, only transmit at appropriate times and according to a particular protocol associated with the transmission system, signals representing information $VSS_1$ supplied by this source $SS_1$, possibly after local processing, to the input of the matching and amplifying means $A_1$, in the form of electric signals $Ve_1$.

The light wave, modulated in pulsed fashion, by the information to be transmitted according to the convention chosen, will be transmitted by the optical fiber f to the receiving terminal 2, detected by an opto-electronic detection means $R_{20}$, for example a semi conductor photodiode and converted in the form of electric signals $VR_{20}$, which signals are matched and amplified by a matching and amplifying means $A_2$. The output signals $VS_2$ from this means will be used in a conventional way by appropriate circuits (not shown in the Figure).

All the arrangements which have just been recalled are common to the prior art.

According to a fundamental aspect of the invention, the optical fiber f will also be used as basic element of at least one circulating memory, i.e. as delay line.

For this, the emitting terminal 1 is provided with at least one pair of opto electronic light energy emitting ($E_{11}$) and receiving ($R_{11}$) means. These means are optically coupled to the transmitting optical fiber f, for example by means of a multiplexer ($MX_1$) which will be described further on in more detail and by optical fiber lengths, respectively $fE_{11}$ and $fR_{11}$.

The light emitter $E_{11}$, which may also be a light emitting diode or a semi conductor laser diode, is controlled by electric signals $VE_{11}$ representing information to be stored. These signals are transformed into light pulses injected, via the optical fiber $fE_{11}$ and multiplexer $MX_1$ into the optical fiber f.

According to an important arrangement of the invention, source $E_{11}$ emits radiation of wave length $\lambda_1$ distinct from the wave length $\lambda_0$ emitted by source $E_{10}$.

The waves of wave lengths $\lambda_0$ and $\lambda_1$ are both guided and transmitted by the optical fiber f to the receiving terminal 2.

According to another arrangement of the invention this latter comprises, inserted in the transmission line and in this case disposed between the optical fiber f and the detection means $R_{20}$, selective means $MD_{20}$ for retransmitting the wave of wave length $\lambda_1$. In the example illustrated, these means are formed by a dichroic mirror reflecting the light wave of wave length $\lambda_1$ and transmitting all the other wave lengths in particular the wave length $\lambda_0$.

The light wave of wave length $\lambda_1$ is then retransmitted by the optical fiber f to the emitting terminal 1 and, via the multiplexer $MX_1$ and the length of optical fiber $fR_{11}$, to the opto-electronic detector $R_{11}$. This latter converts the light energy detected into an electric signal available at its output: $VR_{11}$.

This signal may either be regenerated by circuits $RG_1$ and reinjected again, via the emitter $E_{11}$, the optical fiber length $fE_{11}$ and multiplexer $MX_1$, into the transmission optical fiber f, or else be used by control circuits $CC_1$, or else be reinjected and simultaneously be used by these control circuits $CC_1$.

The selective reinjection of signal $VR_{11}$ is achieved by means of a control recirculating signal $S_1$ supplied by the control circuit $C_1$, for example a binary signal one logic state of which permits recirculation and the other logic state of which makes the regneration circuits $RG_1$ inoperative.

The control circuits $CC_1$ also comprise switching elements, for example electronic switches selectively connecting the outputs of source $SS_1$ and of detector $R_{11}$ to the inputs of amplifier $A_1$ and emitter $E_{11}$.

Thus, the signal $VR_{11}$, taken at the output of detector $R_{11}$, may be transmitted to the amplifier $A_1$-emitter $E_{10}$ assembly for conversion into an optical signal in the form of light pulses of wave length $\lambda_0$, and thus transmitted to the receiving terminal 2 to be there detected and used.

The chain of elements which have just been described, more particularly emitter $E_{11}$, the optical fiber length $fE_{11}$, multiplexer $MX_1$, the optical fiber f, used moreover as transmission channel, mirror $MD_{20}$, the optical fiber length $fR_{11}$ and the regenerator $RG_1$ therefore form a recirculating memory.

The capacity of this memory may be determined in a simple way. In fact, if Lf is the length of the optical fiber f expressed in kilometers, $D_N$ the flow rate of a digital train expressed in bits/second and $\tau_0$ the mean travel time of the light in a fiber length f, the capacity C of the memory obeys the relationship $$C=2\tau_0 L_f D_N$$

By way of example, for a flow rate $D_N$ of a 100 Mb/s, a length $L_f$ of 1 km and a mean propagation time $\tau_0$ of the order of 5 us/km, it is possible to store $10^3$ bits in the recirculating memory.

By using several other wave lengths $\lambda_2, \ldots \lambda_i, \ldots \lambda_n$, distinct from the wave length $\lambda_1$ and also from wave length $\lambda_0$ used for transmission, as many additional circulating memories may be created by duplicating the opto-electronic elements described for the memory of index "1".

Two additional memories of intermediate "i" and maximum "n" indices have been shown in FIG. 1.

As was mentioned in connection with the first circulating memory, the control circuits $CC_1$ establish selective connections between these memories (inputs or outputs), the output of the information source $SS_1$ and the input of the transmission circuits, i.e. in the example illustrated the input of amplifier $A_1$ (signal $Ve_1$). Selective connections can also be established between the memories, for example so as to place the delay lines of the different circulating memories in series so as to artificially increase the capacity thereof. It will of course be readily understood that it is a question of virtual memories, separate only at the level of the software, for they all use, according to an advantageous aspect of the invention, the same medium, i.e. the transmission optical fiber f.

In FIG. 1, by way of illustration, two selective connections 1 and 1' have been shown, which connections provide coupling, on the one hand, between the information source $SS_1$ and the input of the circulating memory of rank "i" so as to temporarily stock the signal $VSS_1$ in this memory and, on the other hand, coupling between the output of the memory of rank "n" (signal $VR_{1n}$) and the input of amplifier $A_1$ so as to transmit the information previously stored in this memory to the receiving terminal 2.

A series of regeneration and recirculation control signals ( $\ldots S_i, \ldots, S_n$) are generated in the control circuit $C_1$ and applied to the regenerators ($\ldots RG_i, \ldots, RG_n$) in the same way as for regenerator $RG_1$.

At all times, the configuration of the selective connections is determined dynamically by transmission management circuits, for example under the control of a recorded program data processing circuit, incorporated in the control circuits $CC_1$. Conventionally this circuit, taking into account a specific protocol adopted for the transmission system, generates control signals for opening or closing logic gates disposed between the points to be connected together. Wired systems may also be used or programmable logic arrays known also under the abbreviation "P.V.L.A.". All these techniques are common to the prior art and do not enter into the specific scope of the invention.

Figure 2:
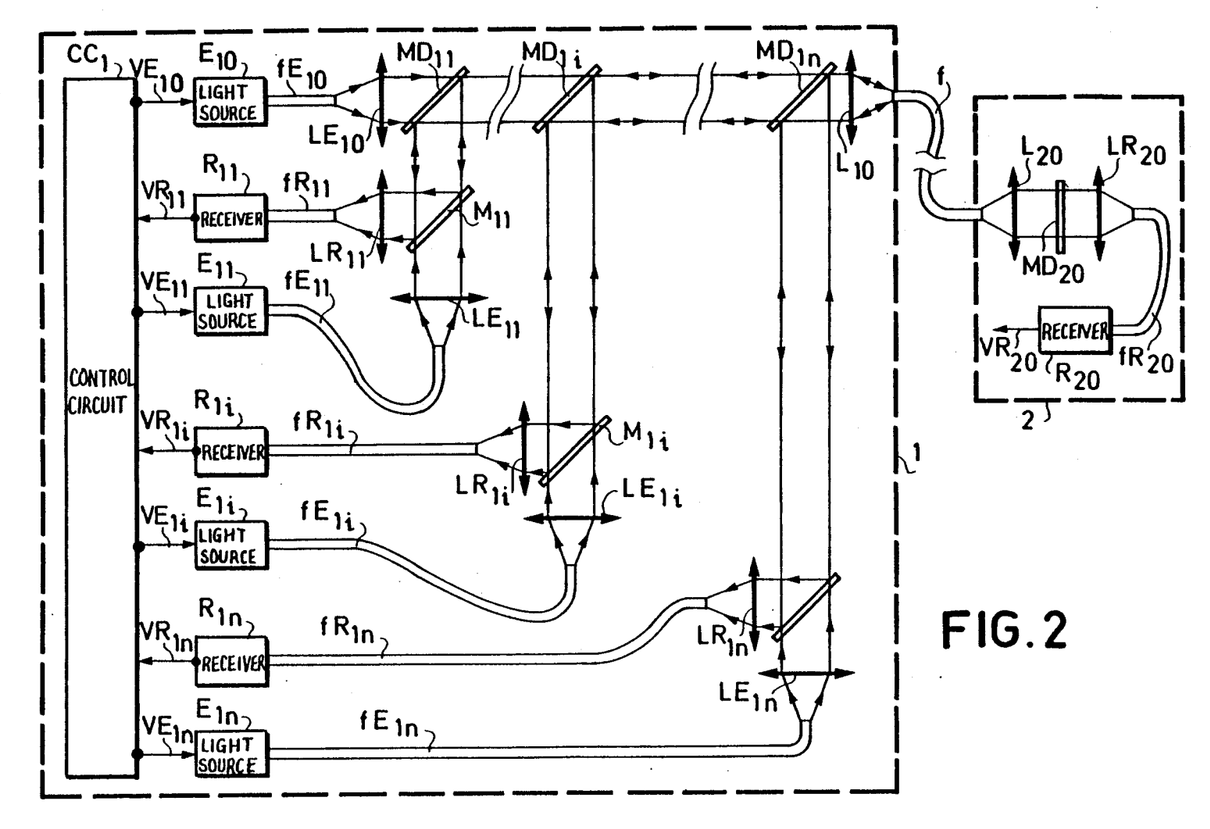
FIG. 2 illustrates one concrete embodiment of such a device.

FIG. 2 illustrates a concrete embodiment of the optical coupling circuits between the terminals and the optical fiber f, more especially multiplexing circuits.

The elements identical to those in FIG. 1 bear the same references and will not be described again. The regeneration means $RG_1$ to $RG_n$ have been grouped together in the control circuits $CC_1$ which receive or transmit the signals $VR_{10}$ to $VR_{1n}$ and $VE_{10}$ to $VE_{1N}$.

The radiation of wave length $\lambda_o$, from source $E_{10}$, is emitted by one of the ends of fiber $fE_{10}$ in the form of a divergent beam. This radiation is collimated by a first lens $LE_{10}$ and refocussed by a second lens $L_{10}$ on the input face of optical fiber f.

In the light path between lenses $LE_{10}$ and $L_{10}$ are inserted dichroic mirrors: $MD_{11}$, $MD_{1i}$, $MD_{1n}$. These mirrors reflect respective wave lengths: $\lambda_1$, $\lambda_i$, $\lambda_n$ and transmit, each one, the other wave lengths without appreciable attenuation.

For each light emitter-receiver pair $E_{1i}$-$R_{1i}$ two collimating lenses are also provided, respectively $LE_{1i}$ and $LR_{1i}$, associated with the end faces of the optical fiber lengths $FR_{1i}$ and $FE_{1i}$.

With these two lenses is associated a mirror $M_{1i}$ with partial transmission T and reflection R coefficients, for example a semi-transparent mirror (T=R=50%). This mirror $M_{1i}$ transmits the beam emitted by source $E_{1i}$ and collimated by lens $LE_{1i}$ to the dichroic mirror $MD_{1i}$ which, in its turn, transmits it to lens $L_{10}$ and the optical fiber f. A light wave of wave length $\lambda_i$ coming from this optical fiber f is collimated by lens $L_{10}$ and is in its turn reflected by the single dichroic mirror $MD_{1i}$ to mirror $M_{1i}$ and is partially reflected to lens $LR_{1i}$.

This assembly of optical elements $LE_{1i}$, $LR_{1i}$, $ML_{1i}$ and $MD_{1i}$ forms one concrete example of formation of a multiplexer of rank i, referenced $MX_I$ in FIG. 1.

The other multiplexers $MX_1$ to $MX_n$ are formed in a similar way. Only the dichroic mirrors differ, in that they are adapted for reflecting, selectively, one and only one of the wave lengths $\lambda_1$ to $\lambda_n$ and not $\lambda_i$. This aspect conforms to the teaching of patent U.S. Pat. No. 3,953,727, to which reference may be made for a more ample description of the multiplexing aspect.

In the receiving terminal, as was mentioned previously, there is disposed a dichroic mirror $MD_{20}$ which reflects all the wave lengths $\lambda$ to $\lambda_n$ and transmits the single wave length $\lambda_0$ used for information transmission purposes.

For a clearer understanding, with the optical components at present available, realistic data for a transmission system of the type which has just been described are the following:
maximum length of the connection: 4 km
typical data flow rate: 100 Mb/s
number of circulating memories: 4
maximum capacity per memory: $4.10^3$ bits.

Examples of components which may be used are shown in Table 1 given at the end of the present description.

The total amount of energy for the system is shown in Table 2 also given at the end of the description.

It is clear from this latter Table, considering that the optical power coupled in the sections of optical fibers $fE_{10}$, $fE_{11}$ to $fE_n$ from a laser diode is greater than 0 dBm and that the minimum optical power required for an error rate less than $10^{-9}$ at a 100 Mb/s is less than $-40$ dBm, that the foreseeable margins are therefore: greater than 31 dB for the transmission line and greater than 21 dB for each circulating memory.

A better balance of the power required for the transmission line and the circulating memories would be obtained by using a light emitting diode for the transmission line emitting radiation centered on wave length $\lambda_0$=about 1300 nm and laser diodes emitting radiation in a "window" going from 700 nm to 800 nm. The specific emission wave length of each diode may be adjusted by controlling the doping of the semi conductor materials.

Thus, the optical power coupled by the light emitting diode is of the order of $-10$ dBm and the attenuation is about 1 dB/Km. The margin of the transmission line is then reduced to 23 dB.

The invention is not limited to the unidirectional transmission of data.

Figure 3:
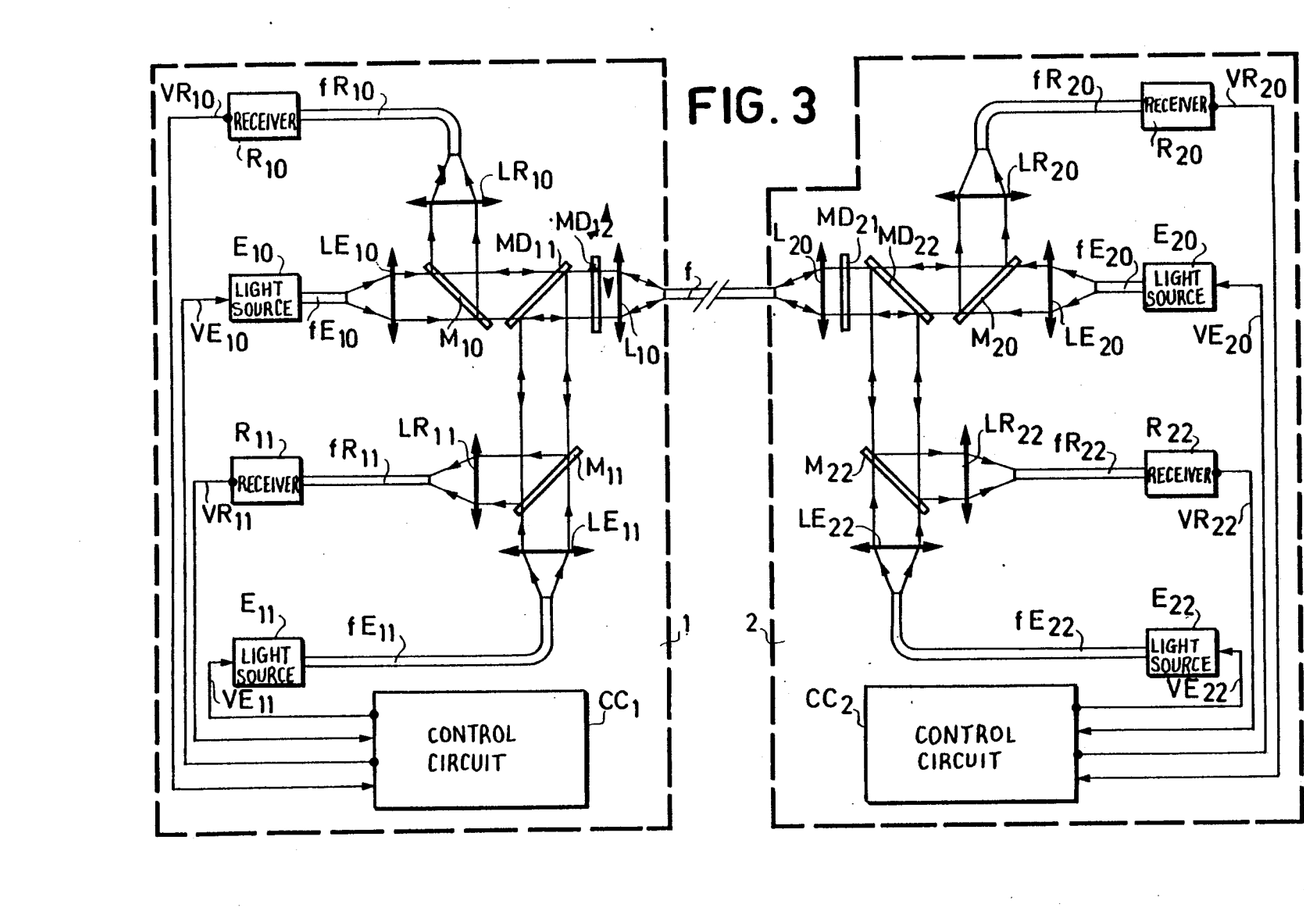
FIG. 3 illustrates one concrete embodiment of a device of the invention adapted for bidirectional information transmission.

FIG. 3 illustrates one example of the architecture of a bidirectional data transmission system transmitting between two emitter-receiver terminals 1 and 2.

For the sake of simplicity, a single circulating memory is shown, associated with each terminal in the embodiment illustrated in FIG. 3.

Each terminal comprises then emitting means, respectively the chain of elements: source $E_{10}$, optical fiber $fE_{10}$, lens $LE_{10}$, for the terminal 1 and source $E_{20}$, optical fiber $fE_{20}$, semi transparent mirror $M_{20}$ and lens $L_{20}$ for terminal 2.

The same goes for the reception means: detectors $R_{10}$ and $R_{20}$, lenses $LR_{10}$ and $LR_{20}$, optical fibers $fR_{10}$ and $fR_{20}$.

It will also be assumed, as before, that the transmissions take place at a wave length $\lambda_0$.

The circulating memories associated with each terminal each comprise elements similar to those described in connection with FIG. 2: an emitter-receiver pair, respectively $fE_{11}$-$fR_{11}$ and $fE_{21}$-$fR_{21}$; collimating lenses, respectively $LE_{11}$-$LR_{11}$ and $LE_{21}$-$LR_{21}$; and a semi transparent mirror and a dichroic mirror, respectively $M_{11}$-$MD_{11}$ and $M_{21}$-$MD_{20}$.

The sources $E_{11}$ and $E_{21}$ emit radiation of wave lengths distinct one from the other, for example of wave lengths $\lambda_1$ and $\lambda_2$ also distinct from the wave length $\lambda_0$. The dichroic mirrors $MD_{11}$ and $MD_{21}$ reflect respectively only wave lengths $\lambda_1$ and $\lambda_2$.

To complete the assembly, terminal 1 comprises a dichroic mirror $MD_{12}$ reflecting the wave length $\lambda_2$ associated with terminal 2 and transmits the other wave lengths, particularly $\lambda_0$ and $\lambda_1$.

Each memory further comprises regenerating means (not shown) in the electronic circuit associated with each terminal and referenced respectively $CC_1$ and $CC_2$.

Similarly, terminal 2 comprises a dichroic mirror $MD_2$, reflecting the wave length $\lambda_1$ and transmitting the wave lengths $\lambda_0$ and $\lambda_2$. With this arrangement, in accordance with the invention, the optical fiber f, the connecting channel between terminals 1 and 2, is further used as delay line and, in addition, placed in common between the memories associated with these two terminals.

The use of an optical fiber lends itself particularly well to the formation of a looped connecting structure. One method of use, generally used in a loop, consists in causing messages of a fixed length to circulate which contain information or else are empty of information. An emitting terminal must wait for an empty message to pass so as to replace it by its own message then, in order to check the correct transmission of the information, it awaits the return of its message in order to replace it by an empty message. It should be noted that two problems arise:

the existence of empty messages must be provided in one way or another, on the other hand, the circulation of the empty messages artificially reduces the effective pass-band (from the information point of view) of the loop.

One solution to these two drawbacks may be found by storing messages at the level of each emitter terminal. In fact, if the emitter is capable of storing one or more messages, the emitting procedure becomes:

the incoming message is an empty message, the emitter replaces it by its own message;

the incoming message is a valid message, the emitter establishes a delay of a message and inserts its own message during this time;

depending on the number of storage elements it has available, it may thus emit several messages;

whenever an empty message appears in the loop, a connector terminal having delayed messages in the storage elements replaces it by a delayed message;

similarly, when a previously emitted message comes back to its source, it is replaced by a delayed message or by an empty message if there is no delayed message.

The possibility of delaying a message, in accordance with the invention, by emitting over the connecting optical fiber with different wave lengths, may allow this procedure to be used under the best conditions. It is sufficient for the delay of each line to be equal to a whole number of messages from 1 to N.

Figure 4:
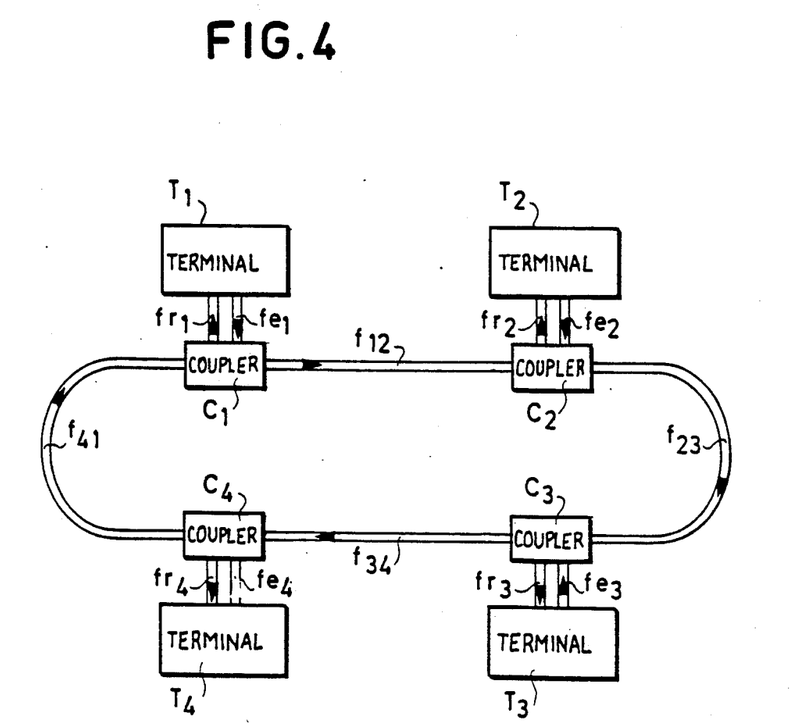
FIG. 4 illustrates a closed loop optical fiber transmission system.

FIG. 4 illustrates one example of the architecture of a closed loop optical fiber transmission system. For the sake of simplicity, only four terminals $T_1$ to $T_4$ have been shown connected by couplers $C_1$ to $C_4$ to the loop formed of optical fibers $f_{12}$ to $f_{41}$.

In general, couplers $C_1$ to $C_4$ have two distinct roles.

A first role is the information reception and transmission role. It is assumed in the example illustrated that the transmissions are of the unidirectional type, that is to say that the information flows in a single direction, by convention in the increasing direction of the indices 1 to 4. Each terminal $T_1$ to $T_4$ is connected to its coupler $C_1$ to $C_4$ by a receiving fiber $fr_1$ to $fr_n$ and a receiving fiber $fe_1$ to $fe_n$.

The second role generally attributed to the couplers is that of optical "short circuit". In fact, when one of the terminals is defective, so as not to greatly reduce the overall reliability of the transmission system, it must not affect the operation of the other terminals and the possibility of communicating therebetween. The defective terminal must then be put out of service and the coupler associated with this terminal must become "transparent" to the transmissions.

Figure 5:
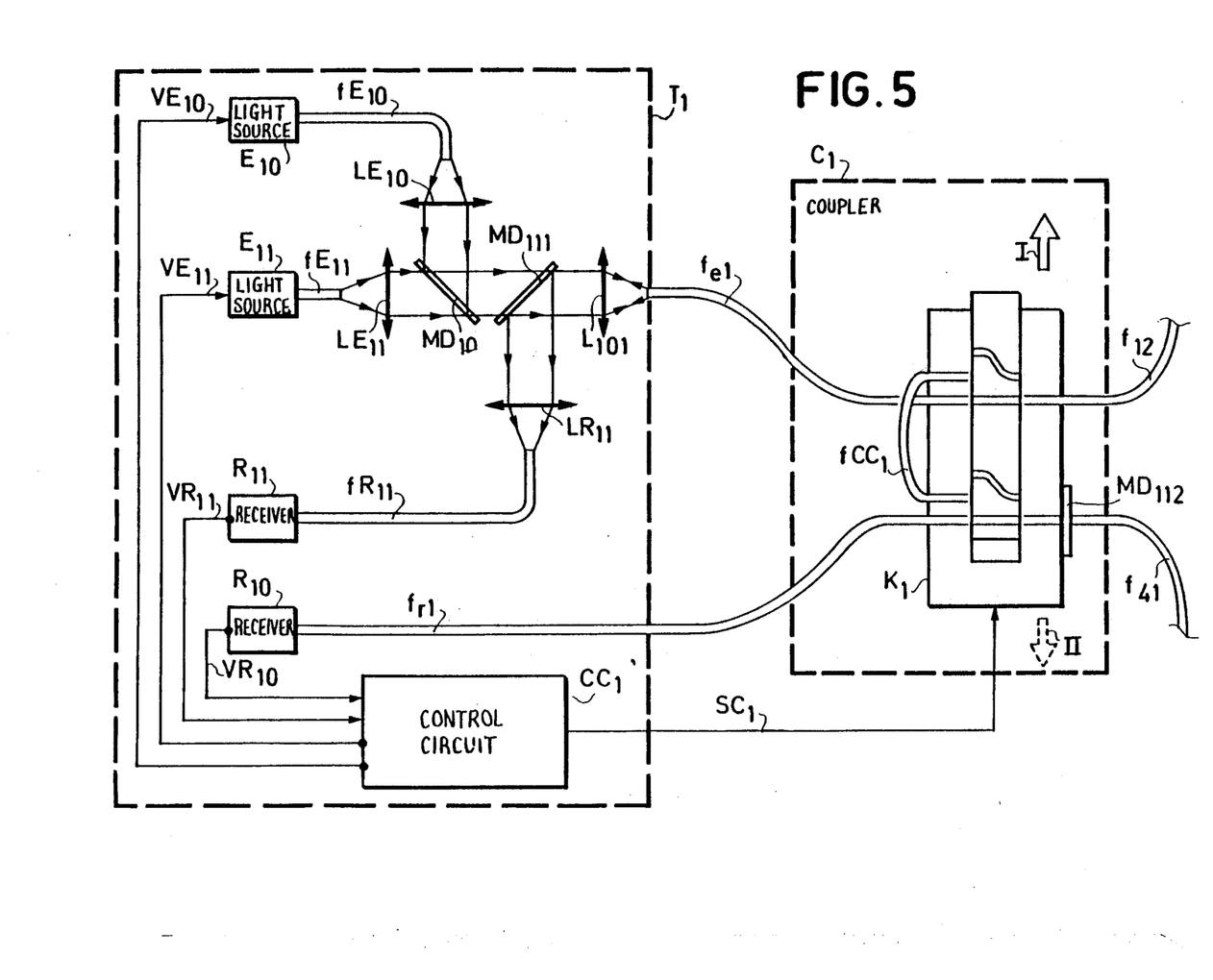
FIGS. 5 and 6 illustrate two concrete embodiments of devices of the invention useful in a transmission system of this type.

A concrete embodiment of terminal $T_1$ comprising the arrangements of the invention and of its associated coupler $C_1$ is illustrated in FIG. 5.

The architecture of this terminal is close to that illustrated in FIG. 2, except that it is necessary to differentiate the reception part from the emission part, the first being coupled optically to the receiving fiber $fr_1$ coming from coupler $C_1$ and the second to the emitting fiber $fe_1$ transmitting the emitted information to couplers $C_1$ for a subsequent transmission to the downstream terminal $T_2$.

For the sake of simplicity, it is assumed, without that being limiting, that terminal $T_1$ comprises only one associated circulating memory.

Coupler $C_1$ is formed in the example illustrated by a mechanically controlled optical switch $K_1$. In the normal operating position (position I) this switch establishes optical coupling between, on the one hand, the emitting optical fiber $fe_1$ and the optical fiber $f_{12}$ coupling between the terminals 1 and 2 (FIG. 4) and, on the other hand, between the receiving optical fiber $fr_1$ and the optical fiber $f_{41}$ coupling between the terminals 4 and 1.

In the out of service position (position II), terminal 1 is optically "short circuited" and the optical fibers $f_{12}$ and $f_{41}$ are coupled to each other directly by an optical fiber $fCC_1$ fixed to the mobile part of switch $K_1$.

This latter is actuated by control means (not shown in FIG. 5) such as an electro-magnetic relay, receiving for example, a control signal $SC_1$ generated by the electronic circuit $CC_1$ associated with terminal $T_1$.

According to the most important aspect of the invention, each optical fiber $f_{12}$ to $f_{41}$ forming the loop is used, in addition to its function as transmission channel, as a delay line for the memory or more generally the circulating memories associated with the terminals situated upstream of these optical fibers $f_{12}$ to $f_{41}$.

For this, each terminal $T_1$ to $T_4$ must comprise a dichroic mirror $MD_{112}$ for terminal $T_1$ or equivalent means for retransmitting to the upstream terminal which is coupled thereto the wave length or lengths used for the circulating memories associated with this terminal, $T_4$ in the example illustrated.

This mirror must be situated preferably at the level of coupler $C_1$, as illustrated in FIG. 5, so as to remain active when terminal $T_1$ is put out of service (position II of switch $K_1$). In the opposite case, the circulating memory of the upstream terminal would comprise two series sections; $f_{11}$ and $f_{12}$ for terminal $T_4$ when switch is in position II.

It has been assumed, in the example illustrated, that each memory comprises a source $E_{11}$, for terminal $T_1$, emitting radiation of wave length $\lambda_1$.

This radiation is multiplexed with the radiation of wave length $\lambda_0$ emitted by source $E_{10}$ by means of a multiplexer comprising a dichroic mirror $MD_{10}$ reflecting the wave length $\lambda_0$. Beforehand, the radiation emitted by sources $E_{10}$ and $E_{11}$ are transmitted by optical fiber coupling sections $fe_{10}$ and $fe_{11}$ to collimating lenses $LE_{10}$ and $LE_{11}$.

The beam coming from multiplexing is transmitted to an additional lens $L_{10}$ for focusing on the end of optical fiber $fe_1$.

The optical fiber $fr_1$, in so far as it is concerned, may be coupled directly to an opto-electronic means $R_{10}$ detecting the wave length $\lambda_0$.

In so far as terminal $T_1$ is concerned the delay line of its associated circulating memory is formed essentially by fiber $f_{12}$, fiber $f_1$ being usually of negligible length. Terminal $T_2$ also comprises, like each terminal, a dichroic mirror (not shown in FIG. 5) reflecting the wave length $\lambda_1$. The waves reflected are transmitted selectively to a detector $R_{11}$ by means of a dichroic mirror $MD_{111}$ disposed between the focusing lens $L_{101}$ and the dichroic mirror $MD_{10}$. The reflected beam is transmitted by a focusing lens $LR_{11}$ to the optical fiber section $fR_{11}$ coupled at its other end to detector $R_{11}$.

The device which has just been described has the advantage of using the same wave lengths for all the terminals in so far as their associated circulating memories are concerned. However, the capacity of these memories is limited to the extent that the whole length of the loop is not used as delay line.

By slightly modifying the architecture of FIG. 5 and by attributing a wave length or wave length spectrum to each terminal distinct from each other, and especially specific to this terminal, it is possible to use the whole of the length of the loop as delay line.

Figure 6:
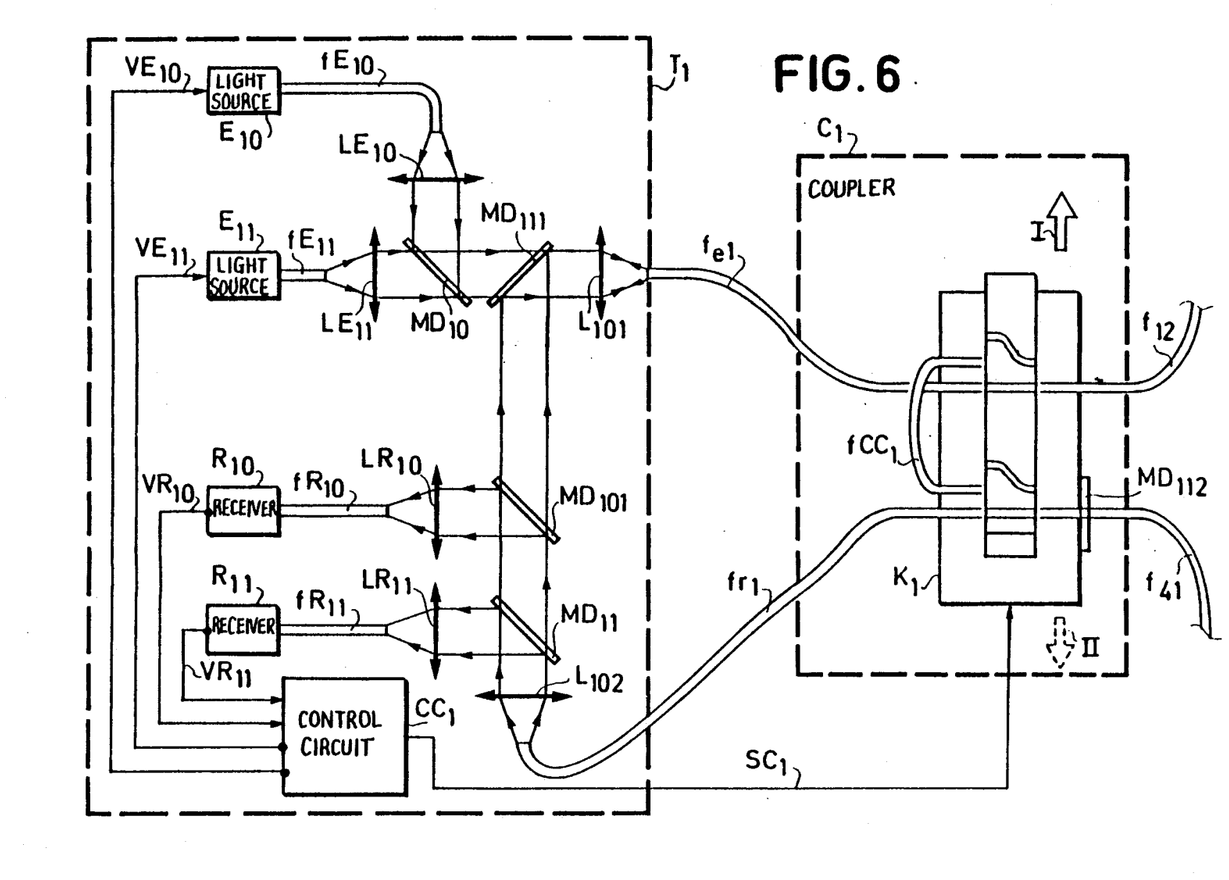

A terminal suitable for architecture of this type is illustrated in FIG. 6.

Coupler $C_1$ is identical to the one described in connection with FIG. 5.

The terminal comprises two separate blocks: a block for emitting wave lengths $\lambda_0$ and $\lambda_1$ and a block for receiving these wave lengths.

The first block comprises sources $E_{10}$ and $E_{11}$, the optical fiber sections $fe_{10}$ and $fe_{11}$, the collimating lenses $LE_{10}$ and $LE_{11}$ and the dichroic mirror $MD_{10}$ reflecting the wave length $\lambda_0$. The collimated beam, conveying the two wave lengths $\lambda_0$ and $\lambda_1$, is transmitted to a focusing lens $L_{101}$ coupling with the optical fiber $fe_1$.

The reception block comprises the opto-electronic means $R_{10}$ and $R_{11}$ for detecting the respective wave lengths $\lambda_0$ and $\lambda_1$, the optical fiber sections $fR_{10}$ and $fR_{11}$, the focusing lenses $LR_{10}$ and $LR_{11}$, a first dichroic mirror $MD_{10}$ reflecting selectively the wave length $\lambda_0$ of a collimated beam coming from a collimating lens $L_{102}$ coupled to the optical fiber $fR_1$ and a second dichroic mirror $MD_{11}$ disposed in the same beam and selectively reflecting the wave length $\lambda_1$.

The collimated beam from lens $L_{102}$, which lens is coupled to the receiving optical fiber $fr_1$, conveys then all the wave lengths received by terminal $T_1$: that is to say in the example illustrated the wave length $\lambda_0$ used for transmission and the wave length $\lambda_1$ specific to the circulating memory associated with the terminal but also all the wave lengths specific to the other terminals, namely, since it has been assumed for the sake of simplicity that there is only one circulating memory per terminal, the wave lengths $\lambda_2$ (terminal $T_2$) to $\lambda_4$ (terminal $T_4$).

In the general case, if we designate by $\lambda_{ij}$ the wave lengths of indices j specific to the terminal of index i, each of these terminals comprises, in the reception block, besides a dichroic mirror reflecting the wave length $\lambda_0$, dichroic mirrors or equivalent means for each wave length $\lambda_{ij}$. These dichroic mirrors transmit all the other wave lengths.

In the example illustrated, downstream of mirrors $MD_{11}$ and $MD_{10}$, the collimated beam conveys the wave lengths $\lambda_2$ to $\lambda_3$. This bleam is intercepted by a semi transparent mirror $M_{101}$, disposed between the dichroic mirror $MD_{10}$ and lens $L_{101}$, which partially reflects the collimated beam towards this latter lens $L_{101}$ so as to transmit these wave lengths to the downstream terminal.

The assembly which has just been described forms then an optical "short circuit" for the wave lengths $\lambda_2$ to $\lambda_4$.

When terminal $T_1$ is brought into service (switch in position II), the optical "short circuit" is obtained directly by the optical fiber $fCC_1$ coupling in this configuration the optical fibers of loop $f_{12}$ and $f_{41}$.

A hybrid architecture may also be obtained between the two architectures which have just been described (FIGS. 5 and 6). In fact, by inserting dichroic mirrors or similar optical elements in the loop or withdrawing them therefrom in a controllable way, a dynamically reconfigurable circulating memory may be obtained: in the example chosen the length of the delay line of each memory and so its capacity may be adjusted at will between one and four sections. Furthermore, if several circulating memories are associated with each terminal, by using the possibilities already mentioned for creating selective and reconfigurable connection also between the memories associated with each terminal, through the electronic control circuits (FIG. 6: $CC_1$), it is further possible to increase the performances and flexibility of the storage devices and thus of the transmision system.

By way of example, among others, if we consider messages of fixed lengths and elementary circulating memories having a capacity of a single memory, by using the reconfiguration possibilities, the different messages circulating in the system may be staggered with respect to each other, rearranged or deleted. Other messages may be inserted. The messages may be transmitted at any time from one terminal to another, used if required and/or restored for a new subsequent transmission.

The invention is not limited to those embodiments explicitly described by way of illustration thereof. The discrete optical elements may more particularly be replaced by elements formed by integrated optics, based on electrooptical couplers for example or by optical elements of other types.

By way of example, the assemblies of type "$LR_{1n}$, $M_{1n}$, $LE_{1n}$" of the terminal illustrated in FIG. 2 may be replaced by a bypass-mixer device such as described in patent U.S. Pat. No. 4,184,739 and multiplexers ($MX_1$ to $MX_n$) or in addition to those of the type described in connection with FIGS. 2 to 6 may be formed in any other ways described in patent U.S. Pat. No. 3,953,727 mentioned above.

Finally, although in the examples illustrated the transmissions were of the series type, it is possible by duplicating the optical connection fibers and the optical elements associated with each fiber, to obtain parallel transmissions of multibit binary words, a bit being transmitted by each optical fiber. This is also true in so far as the circulating memories are concerned.

TABLE 1

| Basic Components | |
|---|---|
| Emitters: | Ga Al ls laser diodes (emission wave length about 850 nm) or Ga In AsP laser diodes (emission wave length about 1300 nm) |
| Receivers: | silicon photodiodes (for a wave length of about 850 nm) or Ga In AsP photodiodes (for a wave length of about 1300 nm) |
| Optical Fibers: | telecommunications type multimode core diameter: 50 um |

TABLE 1-continued

Basic Components core diameter: 125 um
digital aperture: 0.2
pass band: about 500 MHz.km
attenuation: 3 dB/km (approx. for
a wave length of 850 nm)
1 dB/km (approx. for a wave length of
about 1300 nm)
Dichroic Mirrors: pass band: 50 Angstroms

TABLE II

Energy needs: for a distance of 1 km and a data flow rate of a 100 Mb/s (a) On the transmission line

| | |
|---|---|
| losses due to $LE_{10}$, $MD_1$ to $MD_{10}$, $L_{10}$ | 3 dB |
| attenuation in the optical fiber f (at $\lambda_o$ = about 800 nm) | 3 dB |
| losses due to $L_{20}$, $MD_{20}$, $LR_{20}$ | 2 dB |
| losses due to two optical connectors | 2 × 0.5 dB |
| | 9 dB |

(b) In a circulating memory of index i with (i < n)

| | |
|---|---|
| losses due to $L_{li}$, $MD_1$, $L_{10}$+ passage through (n − i = dichroic mirrors: $MD_{1(i+1)}$ to $MD_{1n}$ | 2 × 3 dB |
| losses due to $M_{1i}$ | 2 dB |
| attenuation in the optical fiber f (at $\lambda_i$ = about 800 nm) | 2 × 3 dB |
| losses due to $L_{20}$, $MD_{20}$, $LR_{20}$ | 2 dB |
| losses due to two connectors | 2 × 2 × 0.5 dB |
| | 19 dB |

What is claimed is:

1. A device for storing information in a transmission system comprising at least first and second terminals coupled together by an optical fiber connecting channel having first and second ends, transmission of information being provided by first means for emitting light radiations of a first wavelength modulated by the information to be transmitted and a first opto-electronic means for detecting said first wavelength light radiations, which said first light emitting means and said first opto-electronic means are respectively optically coupled to the first and second end of said optical fiber connecting channel, said coupling to said second end being accomplished through an optical selective means; at least one circulating memory associated with at least one of said terminals using an optical fiber of the connecting channel as a delay line; wherein said circulating memory comprises, in the terminal with which it is associated, second means, optically coupled to said first end of said optical fiber, for emitting light radiation of a second wavelength different from the first wavelength, modulated by information to be stored, a second opto-electronic means, optically coupled to said first end of said opticl fiber, for detecting said second wavelength radiation, said second opto-electronic means being coupled to said second light emitting means, a multiplexer optically coupled to the optical fiber of the connection channel, wherein said radiation of said second wavelength emitted by said second emitting means is fed into said optical fiber at said first end; said optical selective means connected to said second end of said fiber for selective transmission of said radiation of said first wavelength to said first opto-electronic detection means and, in at least another one of said terminals, coupled to said at least one of said terminals by said connecting optical fiber, said optical selective means transmitting said first wavelength radiation to said first opto-electronic means and reflecting said radiation of the second wavelength so that it forms a delay line twice the length of the optical fiber of the connecting channel.

2. The device as claimed in claim 1, wherein information transmission between the first and second terminals is bidirectional, said device futher comprising at least one circulating memory associated with each terminal each using the optical fiber of the connecting channel between the two terminals as delay line and wherein each of the circulating memories comprises means for emitting and detecting light radiation of wave lengths different from one terminal to the other and different from the first wave length and, in each of the terminals, optical means selectively retransmitting to the terminal which is coupled thereto by the optical fiber of the connecting channel, the radiation of wave lengths emitted by the emitting means of each circulating memory associated with said coupled terminal.

3. The device as claimed in claim 1, wherein, with the connecting channel forming a closed loop comprising optical fiber segments connecting together two of said terminals, the circulating memories associated with each terminal comprise a delay line formed by the optical fiber segment connecting together said two terminals wherein one terminal comprises optical means selectively retransmitting to the other terminal the radiation emitted by the emitting means of the circulating memory of said other terminal so as to form a circulating memory whose delay line has a length equal to twice the length of the optical fiber segment connecting said two terminals together.

4. The device as claimed in claim 1, wherein each circulating memory further comprises a controllable electronic circuit for the selective regeneration and recirculation of the information stored in each circulating memory, said electronic circuit receiving a signal from the opto-electronic conversion provided by said second detecting means and retransmitting it to a control input of the radiation emitting means.

5. The device as claimed in claim 1, wherein the multiplexers of each circulating memory comprise a dichroic mirror reflecting the radiation of the first wave length emitted by the radiation emitting means of the circulating memory and transmitting all the other wave lengths.

6. The device as claimed in claim 1, wherein said optical selective means comprises a dichroic mirror.

7. The device as claimed in claim 1, wherein each light radiation emitting means is a laser diode made from doped semi conductor materials, whose doping rates are selected so that emission takes place at a predetermined wave length.

8. The device as claimed in claim 1, comprising several circulating memories associated with at least one terminal and wherein the wave lengths of the radiation emitted by the emitting means of the circulating memories are different from each other and different from said first wave length, each circulating memory using the optical fiber of the channel connecting with another terminal as delay line and the selective retransmission optical means disposed in said another terminal retransmitting all the radiation emitted by said emitting means of said memories.

9. The device as claimed in claim 1, wherein, with said information transmitted in the form of digital messages of fixed length, each delay line uses an optical connecting fiber of a length such that the capacity of the circulating memory is equal to the elementary capacity required for recording a message or to a whole multiple of this capacity.

10. A device for storing information in a transmission system comprising terminals coupled together by an optical fiber connecting channel, transmission of information being provided by a first means emitting light radiation modulated by information to be transmitted of a first wave length and a first opto-electronic means for detecting this radiation, which first emitting means and said first opto-electronic means are optically coupled to said optical fiber connecting channel; the connecting channel forming a closed loop formed of optical fiber segments connecting together the terminals in twos, so as to provide transmission between an upstream terminal and a downstream terminal, comprising at least one circulating memory associated with one of said terminals said memory including a delay line formed by said optical fiber segments forming the whole of the connecting channel, second means for emitting light radiation of a second wave length, different from said first wave length, first optical means coupling said second emitting means to the optical fiber segment connecting said one terminal to a downstream terminal, second opto-electronic means in said one terminal for detecting said second wavelength radiation, second optical means coupled to the optical fiber segment connecting said one terminal with an upstream terminal, selectively transmitting the radiation of the second wave length to said second opto-electronic detecting means and third optical means coupling the first and second optical means together so as to form an optical path for the different wave lengths of the other ones of said terminals.

11. The device as claimed in claim 10, wherein said optical means comprise dichroic mirrors.

12. The device as claimed in claim 10, comprising at least one circulating memory associated with each terminal and wherein the wave lengths emitted by each of said radiation emitting means included in each terminal are each different from said first wave length, are different from each other and different from the wave lengths emitted by the emitting means included in the other terminals.

* * * * *